(12) United States Patent
Cuadra

(10) Patent No.: US 8,118,439 B2
(45) Date of Patent: Feb. 21, 2012

(54) REPOSITIONABLE LENS COVER

(75) Inventor: Dean Arthur Cuadra, Santa Monica, CA (US)

(73) Assignee: Irvine Sensors Corp., Costa Mesa, CA (US)

( * ) Notice: Subject to any disclaimer, the term of this patent is extended or adjusted under 35 U.S.C. 154(b) by 67 days.

(21) Appl. No.: 12/800,888

(22) Filed: May 24, 2010

(65) Prior Publication Data

US 2010/0302638 A1  Dec. 2, 2010

Related U.S. Application Data

(60) Provisional application No. 61/217,565, filed on Jun. 2, 2009.

(51) Int. Cl.
*G02B 23/16* (2006.01)

(52) U.S. Cl. .......................................... 359/511

(58) Field of Classification Search .............. 359/511, 359/819, 820
See application file for complete search history.

(56) References Cited

U.S. PATENT DOCUMENTS

| | | | |
|---|---|---|---|
| 3,942,864 A | 3/1976 | Numbers | |
| 4,045,117 A | 8/1977 | Lerner | |
| D247,782 S | 4/1978 | Blumberg | |
| 4,131,147 A | 12/1978 | Schrage | |
| 4,327,960 A | 5/1982 | Gould | |
| 4,341,436 A | 7/1982 | Kanno | |
| 4,600,278 A | 7/1986 | Saito | |
| 4,641,932 A | 2/1987 | Harms | |
| D298,761 S | 11/1988 | Yoshida | |
| 4,814,806 A | 3/1989 | Flax | |
| 4,909,617 A * | 3/1990 | Boyd | 359/511 |
| 5,805,944 A | 9/1998 | Barclay | |
| 6,033,130 A | 3/2000 | Muroi | |
| 6,247,855 B1 | 6/2001 | Motohashi | |
| 6,672,777 B2 | 1/2004 | Kobayashi | |
| 6,799,854 B1 | 10/2004 | Steiner | |
| 6,971,754 B2 | 12/2005 | Flora | |
| 7,297,938 B2 | 11/2007 | Fauci | |
| 7,507,042 B2 | 3/2009 | Yen | |

* cited by examiner

*Primary Examiner* — Euncha Cherry
(74) *Attorney, Agent, or Firm* — W. Eric Boyd, Esq.

(57) ABSTRACT

A selectively positionable lens cover is disclosed having a lens housing volume and an arcuate lip portion for the selective engagement to and disengagement from a lens. The lens cover has a first engagement structure whereby the first engagement structure may be releaseably engaged with and removed from a second engagement structure. The lens cover has an aperture having a first longitudinal axis whereby the first engagement structure may be selectively engaged with and removed from the second engagement structure in a first position that is substantially aligned with a user-defined second longitudinal axis.

6 Claims, 2 Drawing Sheets

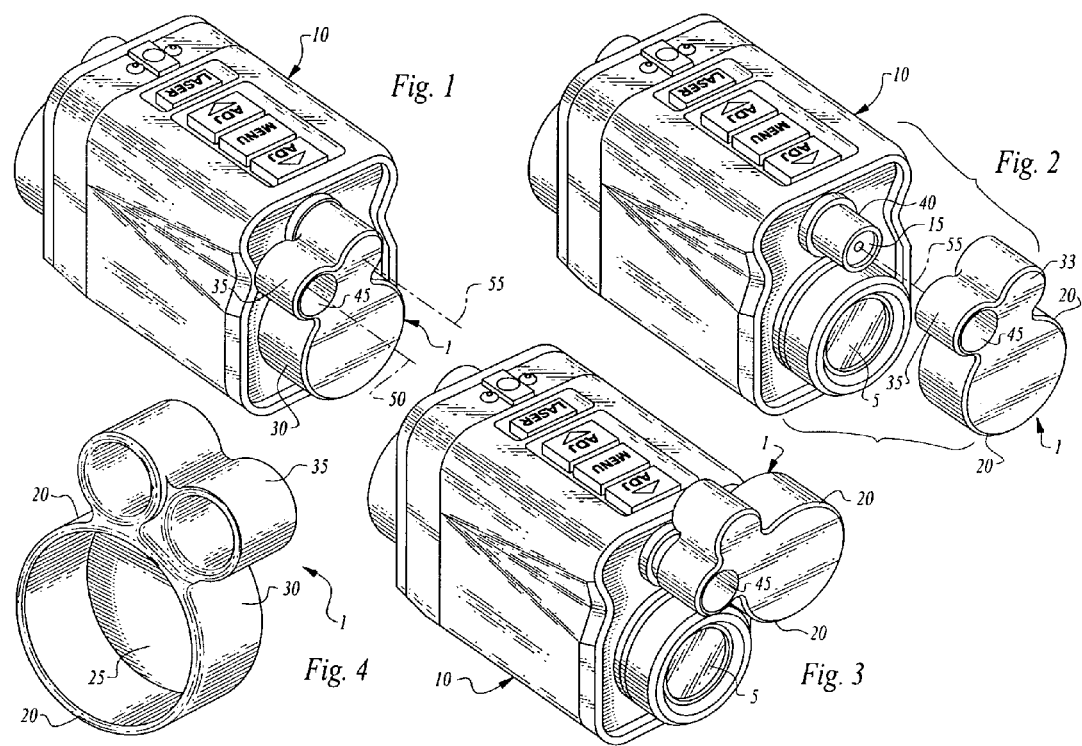

REPOSITIONABLE LENS COVER

CROSS-REFERENCE TO RELATED APPLICATIONS

This application claims the benefit of U.S. Provisional Patent Application No. 61/217,565, filed on Jun. 2, 2009 entitled "Lens Cap" pursuant to 35 USC 119, which application is incorporated fully herein by reference.

STATEMENT REGARDING FEDERALLY SPONSORED RESEARCH AND DEVELOPMENT

N/A

DESCRIPTION

1. Field of the Invention

The invention relates generally to the field of protective devices for optical lenses. More specifically, the invention relates to a lens cover for an optical lens that is repositionable when the lens is in use by means of an engagement structure.

2. Background of the Invention

Optical devices generally have one or more objective lens elements that are desirably protected from the environment and mechanical damage when not in use by means of a removable protective cover (referred to as a lens cover herein).

Removal of a lens cover in preparation for active use of an imaging device, particularly in fielded military applications, creates the problem of temporarily storage of the lens cover, while avoiding its interference with the operation of the imaging device. Anecdotal evidence suggests that in military operations, lens covers on certain thermal imaging devices have been lost, or even intentionally torn away and disposed of in order to avoid the nuisance of a tethered but loose lens cover encroaching into the field of view or otherwise interfering with the operation of the imaging device.

The instant invention solves the above problems by providing an environmentally sealing protective lens cover that is repositionable for temporary storage by means of an engagement structure.

In a preferred embodiment, the lens cover of the invention further comprises an aperture that permits a laser targeting element that is part of an imaging device to be used by an operator while the lens cover is in the stored position.

SUMMARY OF THE INVENTION

A selectively positionable lens cover is disclosed comprising a lens housing volume and comprising an arcuate lip portion for the selective engagement to and disengagement from a lens or lens housing of an imaging device. The lens cover further comprises a first engagement structure whereby the first engagement structure may be releaseably engaged with and disengaged from a second engagement structure.

In a preferred embodiment, the first engagement structure further comprises an aperture having a first longitudinal axis whereby the first engagement structure may be selectively engaged upon and disengaged from the second engagement structure in a stored position that is substantially aligned with a user-defined second longitudinal axis.

The disclosed lens cover requires no moving parts and may be fabricated as a single-piece molded part or as a machined part.

BRIEF DESCRIPTION OF THE DRAWINGS

FIGS. 1-3 are perspective views of an imaging device illustrating the lens cover of the invention in different positions.

FIG. 4 is a perspective view of the invention showing the interior side and features thereof.

Figure 5:
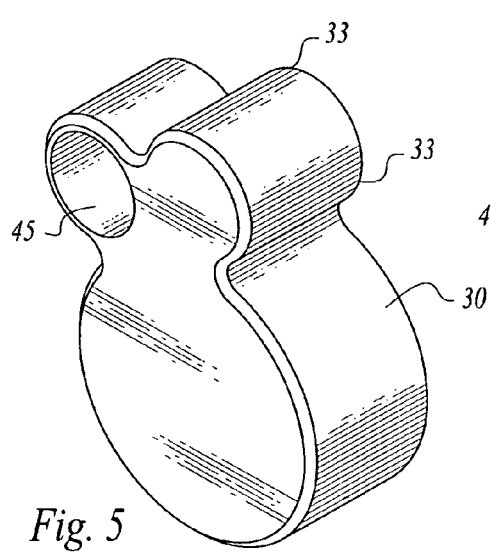
FIG. 5 is a perspective view of the invention showing the exterior side and features thereof.
Figure 6:
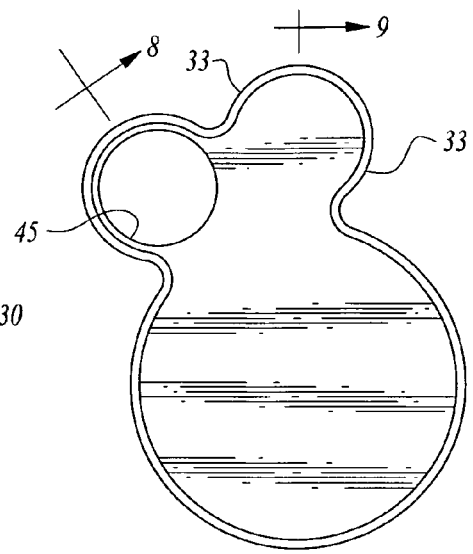
FIG. 6 illustrates a plan view of the exterior side of the invention.
Figure 7:
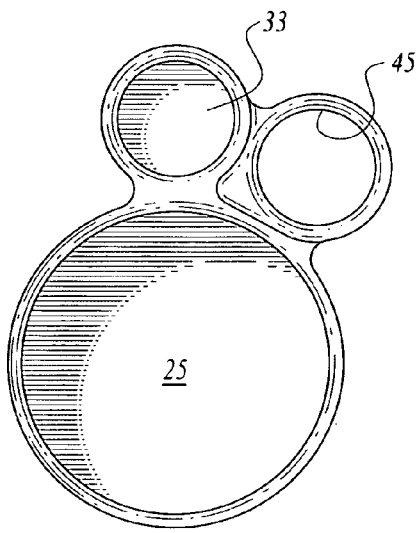
FIG. 7 illustrates a plan view of the interior side of the invention.
Figure 8:
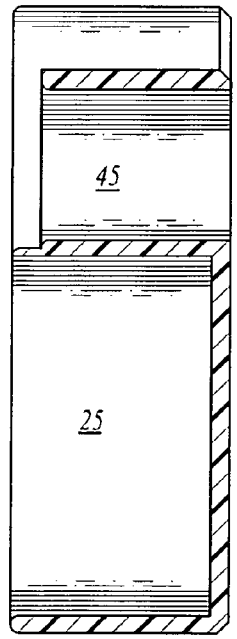
FIGS. 8 and 9 are sectional views taken across 8 and 9 respectively of FIG. 6.
Figure 9:
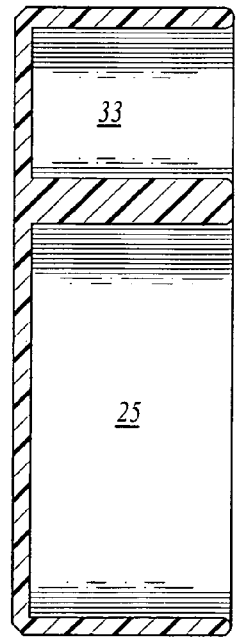

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE INVENTION

Turning now to the figures wherein like numerals define like elements among the several views, the invention described herein is a removable and repositionable lens cover 1 for the protection of, for instance, an optical lens 5 on an imaging device 10 from damage such as scratches, dirt, dust or moisture.

Lens cover 1 includes a feature for the selective positioning or orienting of the lens cover while the optical lens is in use, as is discussed below.

The invention is well-suited for, but not limited to, use with a military thermal imaging device having a laser targeting element 15, which has both a laser lens and a laser housing but is equally suitable for use with other optical devices having one or more objective lenses such as cameras, binoculars, viewers, and the like.

In a preferred embodiment, the invention is a selectively positionable lens cover 1 comprising a first sealing element 20 which primarily functions as the environmental seal and cover for the lens on an imaging device.

First sealing element 20 comprises a first lens housing volume 25 and comprises an arcuate lip portion 30 for the selective engagement to and disengagement from a lens or lens housing.

Lens cover 1 further comprises a second sealing element 33 comprising a first engagement structure 35 whereby first engagement structure 35 may be releaseably engaged with a second engagement structure 40 that is mounted or affixed to imaging device 10. In the illustrated embodiment, second sealing element 33 provides environmental protection for laser targeting element 15.

In the illustrated embodiment, first engagement structure 35 is comprised of a hollow, cylindrical volume.

In a preferred embodiment, first engagement structure 35 comprises an aperture 45 having a first longitudinal axis 50 whereby the first engagement structure 35 may be selectively engaged upon the second engagement structure 40 in a position that is substantially aligned with a user-defined second longitudinal axis 55.

Lens cover 1 is preferably fabricated from an elastomeric material, but may be fabricated from any suitable material. Fabricating lens cover 1 from an elastomeric material desirably provides a flexible structure that provides a compression or interference fit over a lens, lens housing, laser lens and/or laser housing, engagement structure, etc., to hold lens cover 1 in place while the lens is protected, and also while lens cover 1 is repositioned for storage during use of the related imaging device.

As seen in FIG. 1, lens cover 1 is shown affixed to lens 5 and to laser targeting element 15, in a protective position.

As further seen in FIGS. 2 and 3, a user may reposition and concurrently store the invention during imaging device operation, whereby the user removes lens cover 1 from its respective lens/lens housing (FIG. 2), repositions lens cover 1 and then inserts the provided second engagement structure 40 into aperture 45 of first engagement structure 35, whereby lens cover 1 is affixed to imaging device 10 in an operating position such that optical lens 5 of imaging device 10 can be used for viewing.

In the illustrated embodiment, the housing projection for laser targeting element 15 comprises second engagement structure 40. As can be seen, the user may align first longitudinal axis 50 (i.e., the axis of the aperture) with second longitudinal axis 55 (i.e., the axis of the laser targeting element lens) whereby lens cover 1 is affixed to the exterior housing of the laser targeting element while the beam of laser targeting element 15 can be projected to a desired location through aperture 45.

In order to adapt the invention for use with other devices, lens cover 1 may be provided solely with first engagement means 35 and first lens housing volume 25, i.e., without a separate second sealing element 33 (i.e., laser lens cover). In other words, second engagement structure 40 can be provided on the imaging device, or be separately provided and affixed as part of an accessory to the imaging device, such as inside or onto a case, or onto a carrying strap.

Further, first and second engagement means need not be circular or cylindrical in geometry; other geometries may be employed, such as square, hexagonal, octagonal, splined, slotted, keyed, lobular, etc.

Yet further, the respective first and second engagement means may be male-to-female or female-to-male.

As an alternative preferred embodiment to the respective engagement structures show in the illustrations, the axis of first engagement means 35 may be oriented about ninety degrees from the optical axis of the objective lens, allowing lens cover 1 to be positioned horizontally onto the laser housing or other engagement means, thereby positioning the lens cover to serve as a shade means for the lens.

For applications where imaging device 10 is used in darkness (i.e., thermal imagers), predetermined features or surfaces of lens cover 1 may optionally be ribbed or otherwise shaped such that such predetermined features are provided with readily discernable tactile differences. Such tactile features can additionally serve as grips, to assist the user in removing or repositioning lens cover 1.

Additionally, as an alternative to lens cover 1 being completely removable from the imaging device, lens cover 1 may desirably be tethered to imaging device 10, either permanently or otherwise, to prevent loss thereof.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

I claim:

1. A selectively positionable lens cover comprising:
    a first sealing element comprising a first lens housing volume and comprising an arcuate lip portion for the selective engagement to and disengagement from a lens,
    a first engagement structure whereby the first engagement structure is releaseably engageable with a second engagement structure,
    wherein the first engagement structure comprises an aperture having a first longitudinal axis whereby the first engagement structure is selectively engage-able with the second engagement structure in a position that is substantially aligned with a user-defined second longitudinal axis, and,
    wherein the second engagement structure is the housing of a laser element.

2. The lens cover of claim 1 further comprising a second sealing element.

3. The lens cover of claim 1 comprising a non-elastomeric material.

4. The lens cover of claim 1 comprising an elastomeric material.

5. The lens cover of claim 1 wherein the first engagement structure is releaseably engageable with the second engagement structure by means of an interference fit.

6. The lens cover of claim 1 further comprising a tether element.

* * * * *